(12) United States Patent
Ayoub (10) Patent No.: US 7,633,010 B2
(45) Date of Patent: Dec. 15, 2009

(54) CABLE MANAGEMENT SYSTEM

(76) Inventor: Ihab Ayoub, 2210 W. Dallas St., No. 1632, Houston, TX (US) 77019

( * ) Notice: Subject to any disclaimer, the term of this patent is extended or adjusted under 35 U.S.C. 154(b) by 246 days.

(21) Appl. No.: 11/613,174

(22) Filed: Dec. 19, 2006

(65) Prior Publication Data

US 2007/0138349 A1 Jun. 21, 2007

Related U.S. Application Data

(60) Provisional application No. 60/597,776, filed on Dec. 19, 2005.

(51) Int. Cl.
*H02G 3/04* (2006.01)
(52) U.S. Cl. ..................... 174/68.1; 174/68.3
(58) Field of Classification Search ........... 174/36, 174/48, 49, 68.1, 480, 68.3
See application file for complete search history.

(56) References Cited

U.S. PATENT DOCUMENTS

| | | | | |
|---|---|---|---|---|
| 1,843,835 A | * | 2/1932 | Romeiser | 174/103 |
| 2,079,274 A | * | 5/1937 | Baker | 174/95 |
| 2,299,356 A | * | 10/1942 | Strohm et al. | 104/275 |
| 2,391,409 A | * | 12/1945 | Geist et al. | 138/147 |
| 2,595,452 A | * | 5/1952 | Geist et al. | 174/68.3 |
| 3,029,303 A | * | 4/1962 | Severino | 174/97 |
| 4,258,515 A | * | 3/1981 | Owen | 52/105 |
| 4,404,425 A | * | 9/1983 | Rich | 174/107 |
| 4,676,850 A | * | 6/1987 | Strauss et al. | 156/55 |
| 4,801,764 A | * | 1/1989 | Ohlhaber | 174/70 C |
| 5,095,822 A | * | 3/1992 | Martin | 104/275 |
| 5,780,773 A | * | 7/1998 | Wakamatsu | 174/72 C |
| 6,202,565 B1 | * | 3/2001 | Henry | 104/275 |
| 6,367,211 B1 | * | 4/2002 | Weener et al. | 52/220.1 |
| 6,448,497 B1 | * | 9/2002 | McCracken et al. | 174/97 |
| 7,145,079 B1 | * | 12/2006 | Henry | 174/101 |
| 7,309,836 B2 | * | 12/2007 | Lubanski | 174/101 |
| 7,394,025 B1 | * | 7/2008 | Wong | 174/135 |

* cited by examiner

*Primary Examiner*—William H Mayo, III
(74) *Attorney, Agent, or Firm*—Ahab S. Ayoub (57) ABSTRACT

A device for at least partially enclosing a desired length of cable. The device includes at least one member for operatively connecting to a substrate. A conduit located between the member and the substrate provides a passage for one or more cables. Fasteners may be used to secure the device to the substrate and one or more clasps may be located within the conduit for securing the cable in a desired position. Portals may be utilized for the passage of cables into or out of the conduit and adjoining lengths of device may be connected such that their conduits are continuous. The device may be used in place of traditional moldings and provides a safer and more aesthetically appealing alternative for the routing of cables, hoses, tubes, and similar objects. The device may also be configured to form a picture frame, light bar, art niche, or other structures, and may provide light to objects disposed therein. The device may also be configured to be transparent or semi-transparent and may include lights disposed therein to provide accent or decorative lighting to a predetermined location.

14 Claims, 9 Drawing Sheets

CABLE MANAGEMENT SYSTEM

CROSS-REFERENCE TO RELATED APPLICATIONS

This application claims priority to U.S. Provisional Patent Application No. 60/597,776, "CABLE MANAGEMENT SYSTEM" filed on Dec. 19, 2005, and hereby incorporated by reference.

BACKGROUND OF INVENTION

1. Field of the Invention

The invention relates generally to a device for routing and/or storing a length of cable.

2. Background Art

Electrical components have become nearly ubiquitous. Homes and businesses often contain a multitude of electrical appliances. Such appliances are typically accompanied by cables, for power, or the transmission of data. The prevalence of electrical components and their accompanying cables often results in excess lengths of cable that are not appropriately housed or otherwise organized and which may therefore pose a hazard to individuals and pets.

Furthermore, as electrical and electronic devices have become more prevalent, it is often desirable to retrofit older structures to accommodate cables, such as telephone or television lines, power cords, and other cables. Such retrofitting is often an expensive and difficult process and usually involves the drilling of walls or other partitions so that cables may be run therethrough. Accordingly, there is a need for a system for routing and/or storing lengths of cables.

SUMMARY OF INVENTION

In one embodiment, the invention relates to a device for routing and/or storing cables or other longitudinal objects such as hoses. The device comprises a first member configured to house or create a conduit disposed between some portion of the first member and an operatively connected substrate. A second member may also be utilized to operatively connect the first member to the substrate and/or to provide support for one or more cables disposed in the conduit. Clasps and fasteners may also be included for operatively connecting to cables, and connecting the device to a substrate, respectively.

In one embodiment, the device may be formed into picture frames, art niches, light bars, and other configurations for providing light to a proximally-located object. Embodiments may also be configured to include portals for routing one or more cables from within a conduit to a target location. Embodiments may be of any color or design for decorative purposes, and may also comprise transparent or semi-transparent members for disposing lights therein for decorative, accent, or security purposes.

In one embodiment, the invention relates to a method for manufacturing a device for routing and/or storing cables and similar longitudinal objects.

Other aspects and advantages of the invention will be apparent from the following description and the appended claims.

DEFINITIONS

As used herein, the term "conduit" has a preferred meaning of a passage or channel for at least partially enclosing cables and/or other longitudinal objects (e.g., pipes, hoses, etc.). A conduit may comprise a discrete object, such as a tube, or may be formed in another object, or between two or more objects. Other definitions of conduit which do not depart from the spirit of the invention may also apply.

Figure 1:
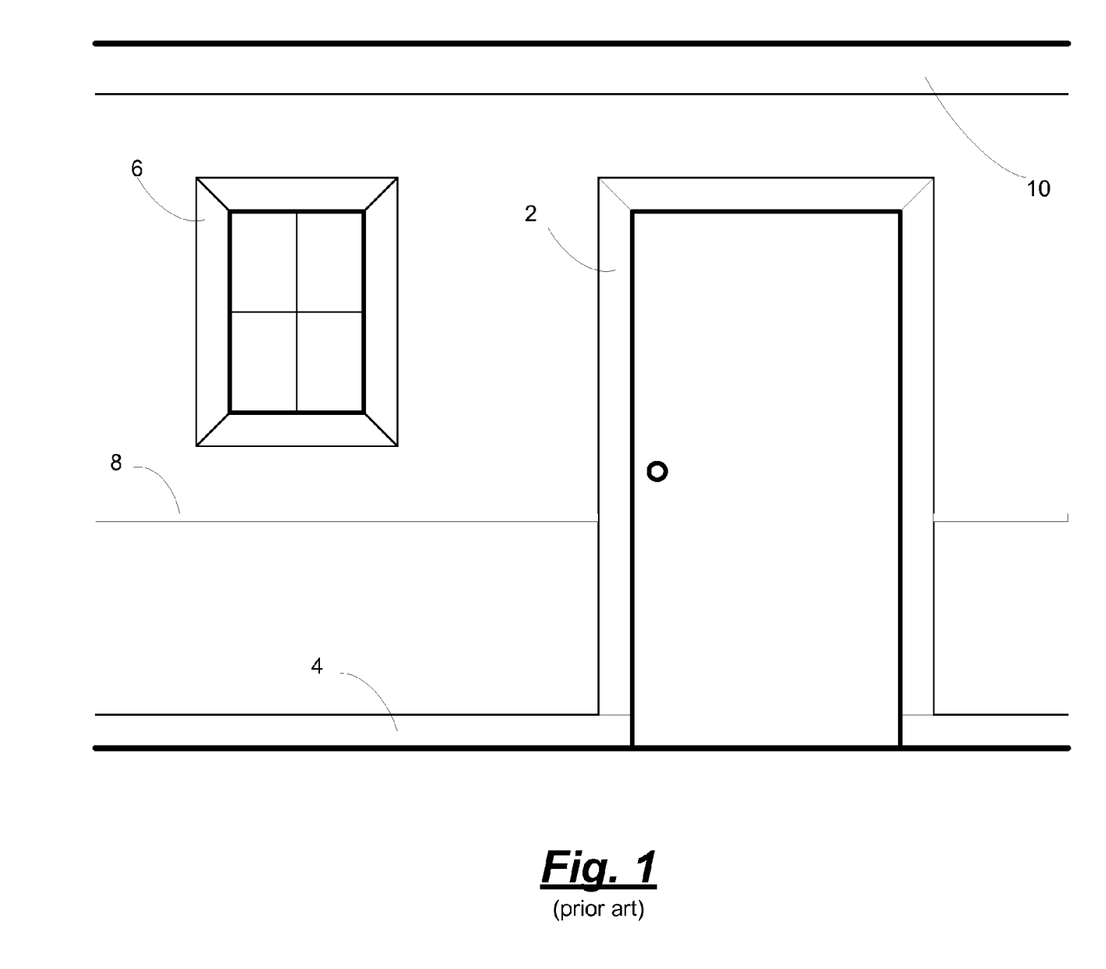
FIG. 1 shows various locations of representative prior art moldings.

As used herein, the term "molding" has a preferred meaning of a strip used along a wall or other partition of a room or building, and around windows and doors. A molding may be made of any material known in the art, and often comprises wood or other structural material. FIG. 1 shows a number of traditional placements for moldings, including around doors 2, along floors 4, around windows 6, along a wall 8, and along a ceiling 10. Moldings may be of any type known in the art, and may have various configurations depending on various factors, including aesthetics. Other definitions of molding which do not depart from the spirit of the invention may also apply.

As used herein, the term "substrate" has a preferred meaning of any thing to which another thing is connected such that the two things will have a desired orientation with respect to one another. Common substrates as may be relevant herein include walls, floors, partitions, and ceilings. Other definitions of substrate which do not depart from the spirit of the invention may also apply.

As used herein, the term "cable" has a preferred meaning of a longitudinal object, typically comprising one or more wires, used for conducting electrical and/or data signals. A cable and its components may be of any type known in the art. Other definitions of cable which do not depart from the spirit of the invention may also apply.

DETAILED DESCRIPTION

Figure 2:
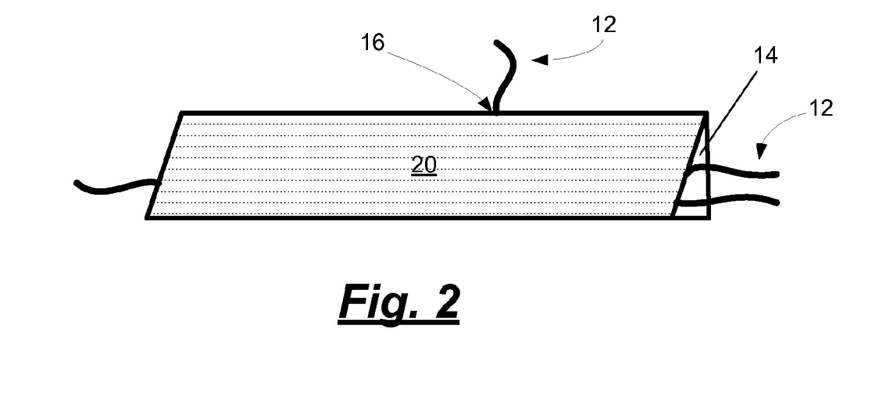
FIG. 2 is an oblique view of one embodiment of the invention.

In one embodiment, the invention comprises a device for placement along walls, window frames, doorframes, floors or other components of a structure. As shown in FIG. 2, the device is configured to at least partially enclose one or more cables 12 within a conduit 14. The conduit 14 may be enclosed within the device, may be formed between the device and a substrate to which the device is operatively connected, or may be of any other configuration known in the art. The conduit 14 forms a passage for running cables 12 along a length of the device, and may be configured so that the passage will be continuous across a junction between two or more sections of the device, when the sections are adjacent or in proximity to one another.

In one embodiment the device will comprise one or more entry and/or egress points ("portals") 16 through which at least one cable 12 may enter or exit the conduit 14. Portals 16 may be in the form of holes or grooves in one or more components of the device and may be configured to be opened or closed so that unused portals 16 will not detract from the aesthetic appeal of the device, and so that insects, dust, and other undesirable elements will not easily enter into the conduit 14 through the portals 16. In one embodiment, the portals 16 may comprise a segment of the device that is detachable, or pivotally or otherwise openable. Alternatively, portals 16 may be drilled or otherwise created in the device. In one embodiment, the device will include markings or other indicators of preferred locations for the creation of portals 16. The portals 16 may be of any number and may be located at any point along the device.

Figure 3:
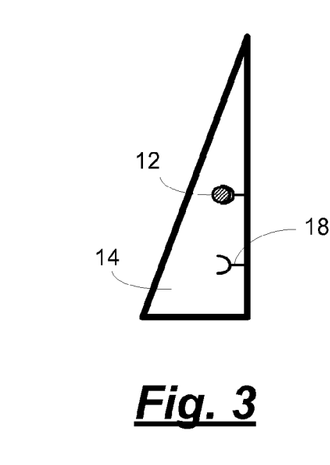
FIG. 3 shows a cross-section of one embodiment of the invention, including a plurality of clasps.

As shown in cross-section in FIG. 3, embodiments of the device may include one or more elements for supporting and/or stabilizing a cable 12 within the conduit 14. These will be referenced generically herein as clasps 18. The clasps 18 extend into the conduit 14 from an interior surface. Clasps 18 may be of any type or configuration known in the art and may reversibly or permanently secure or support a portion of cable 12 within the conduit 14. Clasps 18 may comprise discrete elements operatively connectible to the device, or may be formed as a protrusion of an interior surface of the conduit 14.

Figure 7:
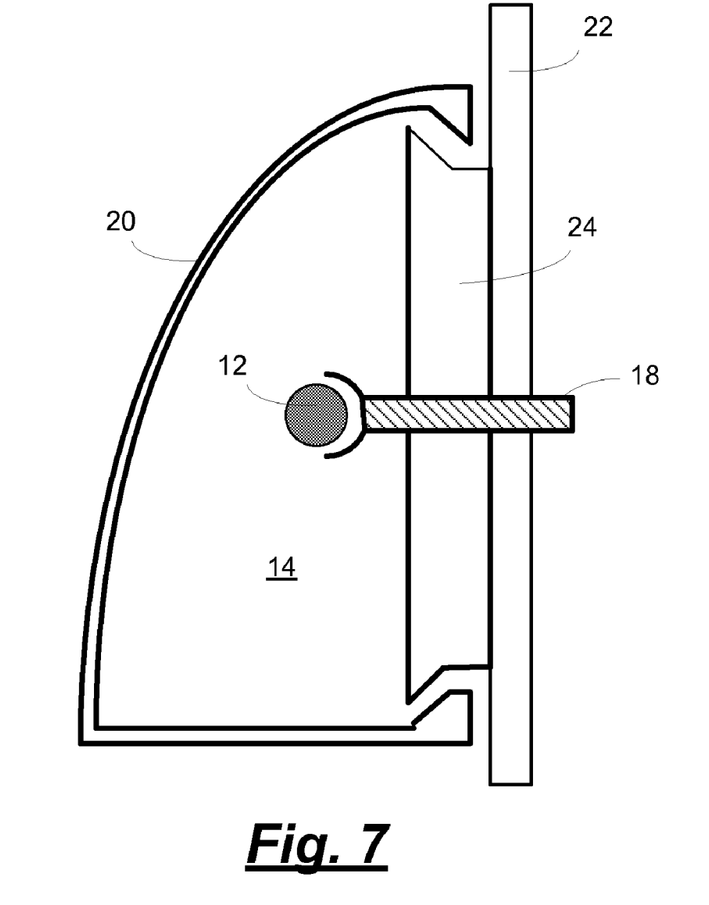
FIG. 7 shows a cross-section of one embodiment of the invention, having a combination clasp and fastener.

Predetermined locations may be configured to operatively connect to the clasps 18 such that clasps 18 may be permanently or reversibly connected to the device. The clasps 18 may further comprise a fastener configuration for permanently or reversibly connecting the device and/or components thereof to a substrate 22 (as shown in FIG. 7). For example, the base of the clasps 18 may be configured to be a screw or nail, or any other type of fastener known in the art. Clasps 18 advantageously provide for the stabilization and routing of cables 12 within the conduit 14, typically in an elevated position. Clasps 18 also provide for the separation of parallel lengths of cable 12 such that electrical or other forms of interference is lessened. Furthermore, disposing two or more clasps 18 within the conduit 14 advantageously facilitates the coiling of a length of cable 12 such that it may more easily be stored within the conduit 14.

Figure 4A:
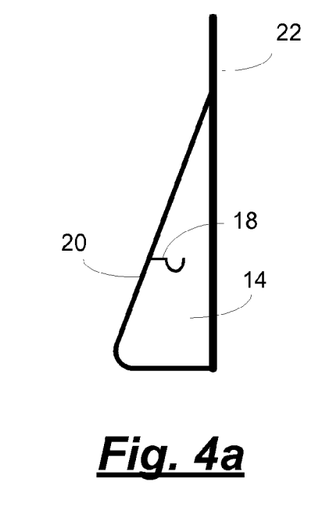
FIG. 4 shows a cross-section of one embodiment of the invention.

As shown in the embodiment of FIG. 4a, the device may comprise a first member 20. The first member 20 may be operatively connected to a wall or other substrate 22, such as a partition or traditional molding or baseboard such that a conduit 14 is formed between some portion of the first member 20 and the substrate 22. The first member 20 may have any desired configuration, including any desired aesthetic appearance. One or more clasps 18 may also be operatively connected to an interior surface of the first member 20.

Figure 4B:
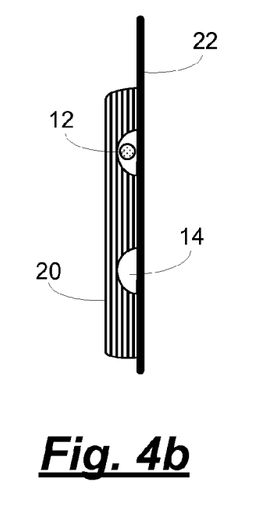

As shown in the embodiment of FIG. 4b, the first member 20 may be configured such that one or more conduits 14 are formed at least partly within the body of the first member 20. Such a configuration advantageously retains one or more cables 12 in one or more predetermined positions. Furthermore, indicators and/or guides may advantageously be provided on an exterior surface of the first member 20 to direct the placement of fasteners, e.g., nails or screws (not shown) such that they do not contact the cables 12 as they pass through the first member 20. Alternatively, predetermined holes may be provided for the passage of fasteners through the first member 20 at predetermined locations.

Figure 5:
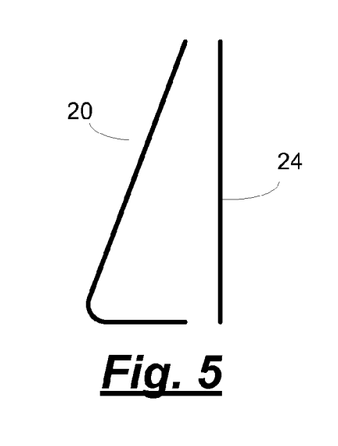
FIG. 5 shows a cross-section of one embodiment of the invention.

Alternatively, as shown in the embodiment of FIG. 5, the first member 20 may operatively connect to a second member 24. In such an embodiment, the second member 24 may be operatively connected/connectible to a substrate 22, such as a wall, partition, or traditional molding. The second member 24 may be of any desired length and/or configuration. In one embodiment, it may be of a size no greater than is required to operatively connect to a substrate 22, thereby being disposed at selected locations between the first member 20 and a substrate 22. In one embodiment, the second member 24 may have a length similar to that of a first member 20, capable of being disposed parallel to a length of the first member 20. Embodiments which utilize a second member 24 in addition to a first member 20 advantageously allow for the fastening of the first member 20 to a substrate 22 without the need for externally-visible fasteners, thereby providing a more aesthetically pleasing appearance. Such embodiment further facilitate the use highly decorative first members 20. Clasps may be operatively connected to an inner surface of a first member 20 and/or second member 24.

In one embodiment the first member 20 may operatively connect to both a substrate 22 and a second member 24. The operative connection of members to each other, and/or to a substrate 22, may be permanent or reversible. Furthermore, either member and/or the substrate 22 may be configured to fasten each other. This may be achieved through the use of friction contact surfaces, mating configurations, slots, and/or attachment points for fasteners, as well as any other mechanism known in the art. The members may comprise plastic, wood, metal, a combination thereof, or any other material known in the art. Furthermore, one or more members may comprise a transparent or semi-transparent material so that lights, or other objects located within the conduit 14 will be visible to an observer. In one embodiment, the device may include a transparent and/or semi-transparent member for use with outdoor lights (e.g., Christmas lights).

Figure 6A:
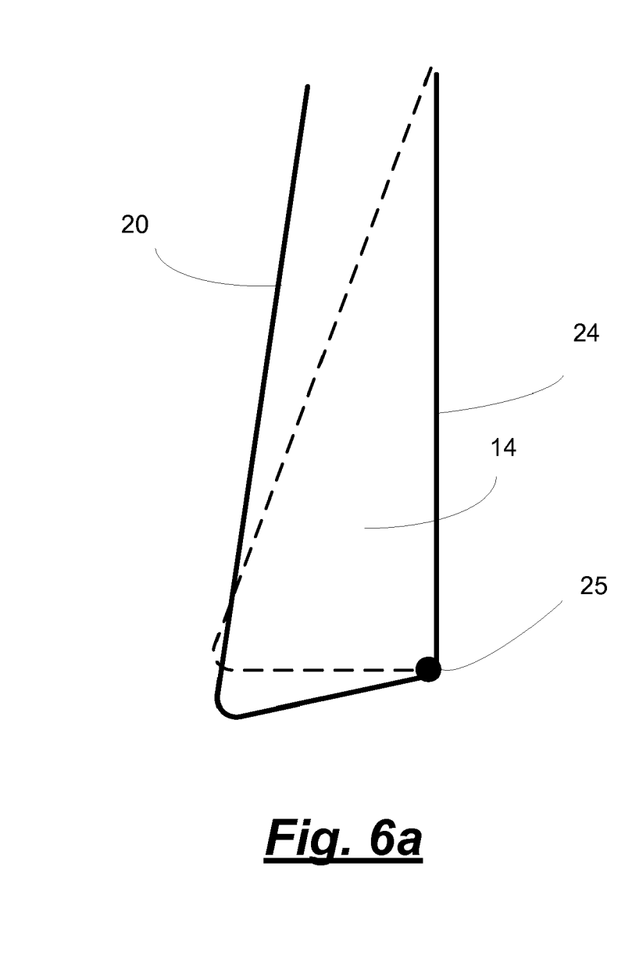
FIG. 6a shows a cross-section of one embodiment of the invention, having a hinged or flexible operative connection.

As shown in the embodiment of FIG. 6a, the operative connection between the first member 20 and second member 24 or substrate 22 may comprise a hinge 25 or similar structure that will allow for a pivoting connection such that the conduit 14 may be more easily accessed. A flexible or rotatable configuration advantageously permits access to the conduit 14 without complete detachment of the first member 20 from the second member 24 or substrate 22. The hinge 25 may be of any type known in the art, including a living hinge. Embodiments of the device may also include one or more hinges 25 in any desired location. For example, a hinge 25 may be disposed such that only a portion of a first member 20 or second member 24 is openable.

Figure 6B:
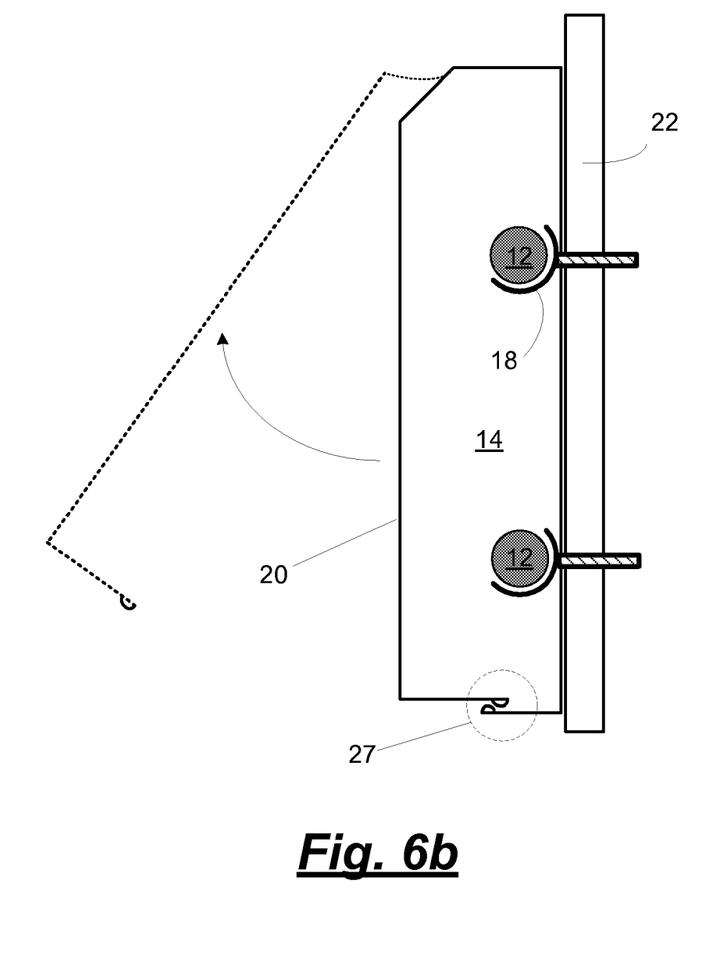
FIG. 6b shows a cross-section of one embodiment of the invention, wherein a first substantially encloses a conduit, yet is flexible to permit access to the conduit.

As shown in FIG. 6b, in one embodiment, the first member 20 may configured to substantially enclose a conduit 14, while being comprised of a flexible material to permit access to the conduit 14. The configuration of either member to permit access to the conduit 14 may be of any type known in the art. In one embodiment, the device comprises a single unitary member that is curved, folded, or otherwise configured (e.g., as shown in FIG. 6b) to form a conduit 14. In one embodiment, the first member 20 comprises one or more sub-members that are removable or openable for access to the conduit 14. In various embodiments, a frictional operative connection (such as that shown at 27) may be used to operatively connect two or more separate members, or alternatively, as shown in FIG. 6b, two parts of a single member. Such embodiments may also include clasps 18, which, as shown in FIG. 6b, may also be configured to be fasteners, for fastening the device to a substrate 22. Alternatively, the clasps 18 and fasteners may comprise separate elements. In one embodiment, the device may be operatively connected to a substrate 22 using adhesives. Frictional interfaces may be of any type known in the art.

The conduit 14 formed between the first member 20 and the second member 24 or substrate 22 may advantageously provide a space for storage of excess lengths of cable 12. Storage of cable 12 within the conduit 14 advantageously provides a safe and aesthetically appealing location for excess lengths of cable 12, which might otherwise accumulate near outlets and/or electrical components. Storage of cable 12 within the conduit 14 may be advantageously facilitated by the disposition of one or more pegs, or clasps, within the conduit, for coiling excess lengths of cable 12 therebetween.

FIG. 7 shows one embodiment of the device, in which a first member 20 is frictionally and/or slideably connected to a second member 24 that is fastened to a substrate 22 by means of a clasp 18 configured to also be a fastener. The second member 24 may include one or more holes for the passage of a fastener, and the fastener may be of any type known in the art. Alternatively, the second member 24 may be operatively connected to a substrate 22 by any means known in the art. In embodiments where the operative connection between a first member 20 and a second member 24 is reversible, such an operative connection may be of any type known in the art, and may be reversed appropriately. For example, in embodiments similar to that shown in FIG. 7, the first member 20 may be snapped onto and off of the second member 24, or maybe be slideably displaced with respect to the second member 24, thereby permitting access to the conduit 14. As previously discussed, the second member 24 may be longitudinal and parallel a length of the first member 20, or may form a discrete attachment point for the first member 20. In the latter embodiment, a plurality of second members 24 may operatively connect to a single first member 20.

Figure 8:
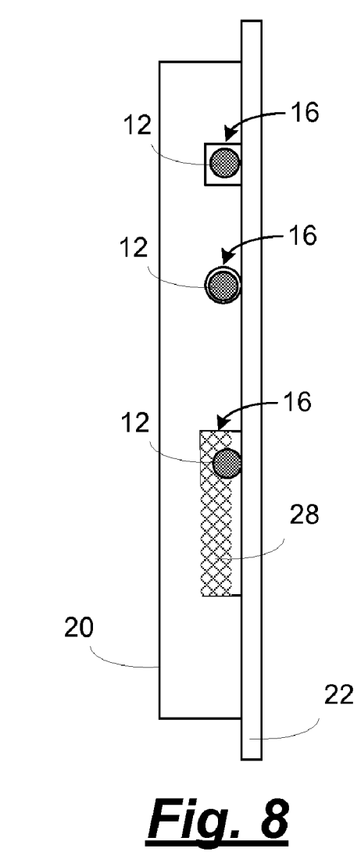
FIG. 8 is a top-down view of one embodiment of the invention.

The top-down view of the embodiment of FIG. 8 demonstrates various configurations of portals 16 formed in a first member 20. Such configurations may include, as shown in the bottom rectangular configuration, open with a resilient substance 28 (e.g., foam, rubber, etc.) that is displaced to some extent by a cable 12 passing through the portal 16. This resilient substance 28 advantageously seals the portal 16 or some portion thereof, when a cable 12 is not disposed therein, advantageously lessening the entry of undesired elements. Such portals 16 may be similarly formed in a second member 24. The examples of portals 16 shown in FIG. 8 are representative configurations. Portals 16 may be of any type and configuration known in the art. Furthermore, portals 16 may be located in any one or more desired surfaces of a first member 20 or second member 24.

Figure 9:
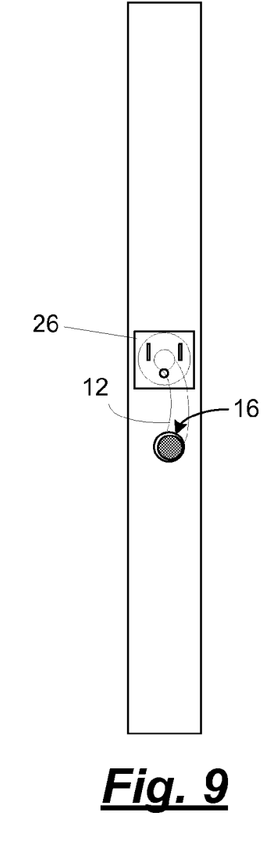
FIG. 9 is a top-down view of one embodiment of the invention, including an outlet.

As shown in the top-down view of FIG. 9, in one embodiment one or more outlets 26 may be provided within the conduit 14. Outlets 26 may be of any type known in the art, including but not limited to power, telephone, data, and television outlets. In one embodiment a first member 20 and/or second member 24 of the device may be configured to transmit power and/or data to one or more outlets 26 disposed in either member. In one embodiment, at least one portal 16 is disposed in a member to allow for passage of one or more cables 12, such that they may operatively connect to the outlet 26, when the outlet 26 is disposed such that it is accessible from within the conduit 14. Outlets 26 may be disposed in either member. Furthermore, outlets 26 may be disposed such that they are formed in an outer surface of a first member 20 or second member 24, advantageously providing exterior accessibility. Power and/or data may be conducted to/from an outlet 26 through one or more cables 12 disposed in a conduit 14 of the device.

Figure 10:
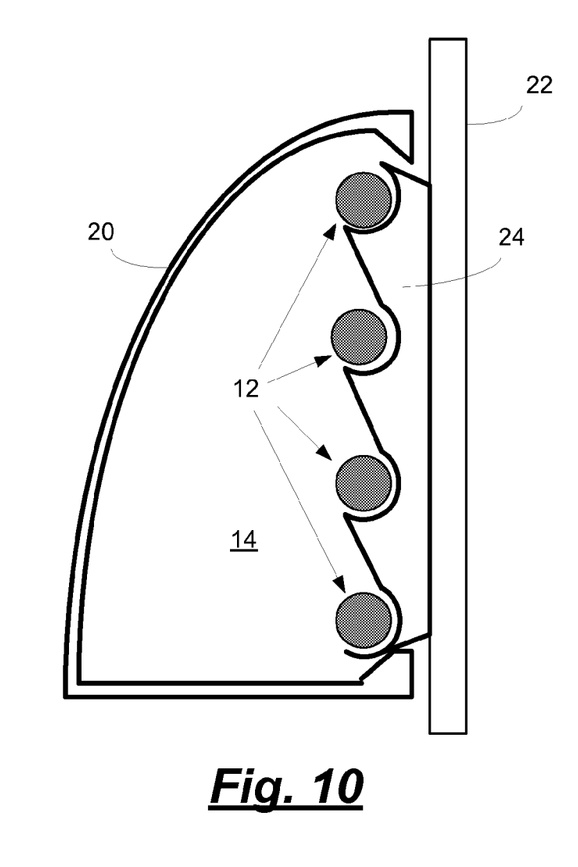
FIG. 10 is a cross-sectional view of one embodiment of the invention, in which the second member is configured to support at least one cable.

As shown in the embodiment of FIG. 10, in place of or in addition to clasps 18 (not shown in FIG. 10) the second member 24 itself may be configured to support one or more cables 12 disposed in the conduit 14. An interior surface of the second member 24 may include grooves for the support and/or partial enclosure of one or more cables 12 within the conduit 14. In one embodiment, the second member 24 or portions thereof may comprise a material that will lessen interference between cables 12 disposed in other grooves.

The first member 20 may be retained by the second member 24 (as shown) or may alternatively be operatively connected directly to the substrate 22, such that the second member 24 will be used only to support one or more cables 12 disposed in the conduit 14. The second member 24 may be of any length and may be configured such that it is shorter than an operatively connected first member 20. In such configurations, a plurality of second members 24 may be utilized with a single length of first member 20. In one embodiment, the first member 20 may be configured to support one or more cables 12 disposed in the conduit 14.

Figure 11:
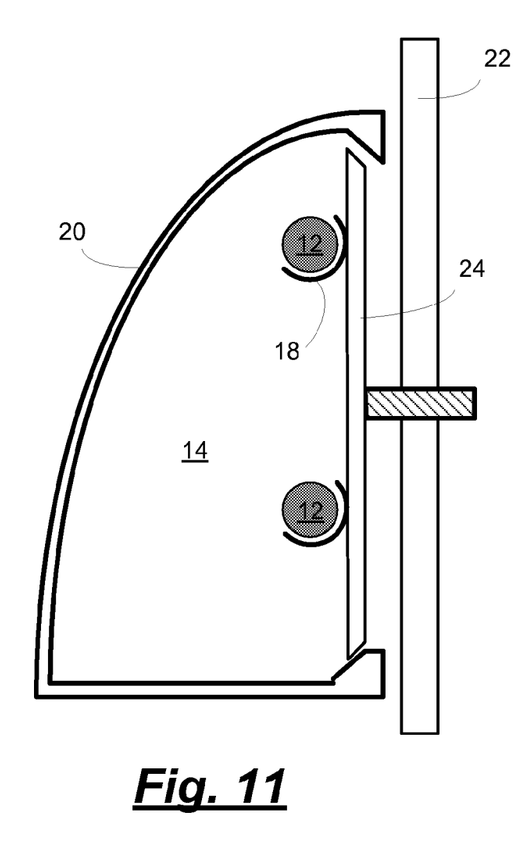
FIG. 11 is a cross-sectional view of one embodiment of the invention, wherein a second member includes a plurality of clasps and is fastened to a substrate.

As shown in the embodiment of FIG. 11, the first member 20 may operatively connect to a second member 24 having one or more clasps 18 and operatively connected to a substrate 22. Clasps 18 may be permanently or reversibly connected to the second member 24 and may be of any configuration known in the art. As shown in FIG. 11, the second member 24 need not be positioned such that it is flush against a substrate 22. Furthermore, the first and second members 20, 24 may include any configuration for operatively connecting to one another and/or a substrate 22. In one embodiment, predetermined points on an interior surface of either member 20, 24 may be configured to operatively connect to one or more clasps 18, thereby advantageously permitting the disposing of a desired number of clasps 18 in desired locations within the conduit 14. Such configurations advantageously provide an adaptability to embodiments of the invention, allowing for the placement of varying numbers and/or sizes of cables 12 within the conduit 14.

Figure 12:
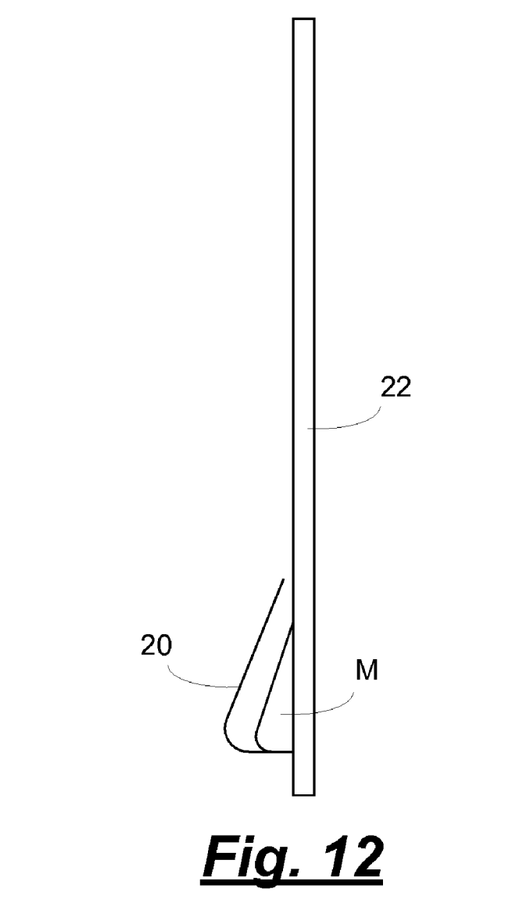
FIG. 12 is a cross-sectional view of one embodiment of the invention, wherein a first member is used with a traditional pre-existing molding.

As shown in FIG. 12, in one embodiment, a first member 20 may be used without a second member 24, and may be configured to accommodate and/or operatively connect to a traditional molding M or other protrusion so that a conduit 14 is formed between the first member 20 and the traditional molding M or protrusion, or otherwise between the first member 20 and the substrate 22 (e.g., the conduit 14 could be formed above the traditional molding M, between the first member 20 and the substrate 22). Embodiments that can be used with traditional moldings M advantageously provide a conduit 14 for a cable 12 without requiring removal of any traditional molding M that may have been located along a portion of substrate 22 at which it is desired to house and/or route a cable 12. When used with a traditional molding M or other protruding substrate 22, a second member 24 if present may be configured to accommodate the topography of any such substrate 22 and/or traditional molding M. In one embodiment, the device may be used in place of a traditional molding M, and may be shaped and/or otherwise configured to have the appearance of a traditional molding M.

In one embodiment, the ends of the members are configured to operatively connect to adjacent members such that the conduits 14 of adjacent members are operatively connected. This may occur along a linear section of the device, or at a corner or other intersection of two or more members of the device. The ends of one or more members may be configured to permanently or reversibly connect to the ends of one or more adjoining members. Such configurations may be of any type known in the art.

Figure 13:
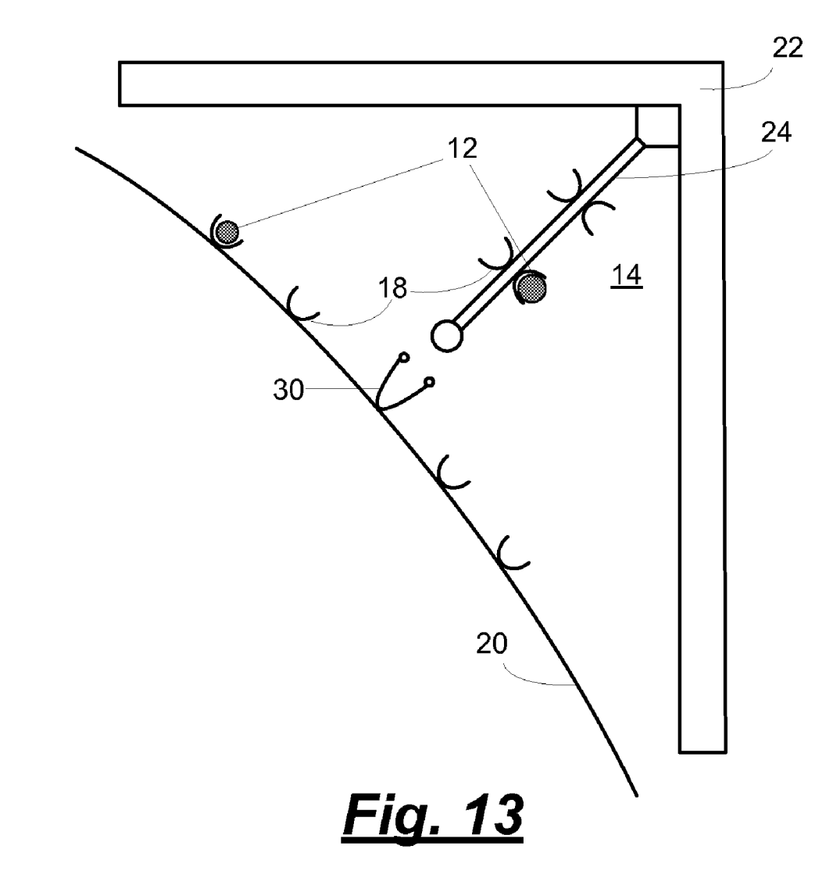
FIG. 13 is a cross-sectional view of one embodiment of the invention, wherein a first member extends along two substrates, forming a conduit in the area of interface of both substrates.

As shown in FIG. 13, when used at the interface between ceiling and wall, or between two walls, it may be desirable to configure the device such that it extends along both substrates 22. In such configurations, the second member 24 may be configured to operatively connect to a connector 30 disposed on an inner surface of the first member 20, such that a conduit 14 is disposed between the first member 20 and substrate. The first member 20 and/or second member 24 may each include one or more clasps 18 for reversibly connecting to a cable 12. The operative connection between the second member 24 and substrate 22 may be of any type known in the art. The operative connection between the first member 20 and second member 24 may be permanent or reversible, and may be of any type known in the art. Furthermore, the first member 20 may be configured to operatively connect directly to the substrate 22. Such a connection may also be of any type known in the art.

Figure 14:
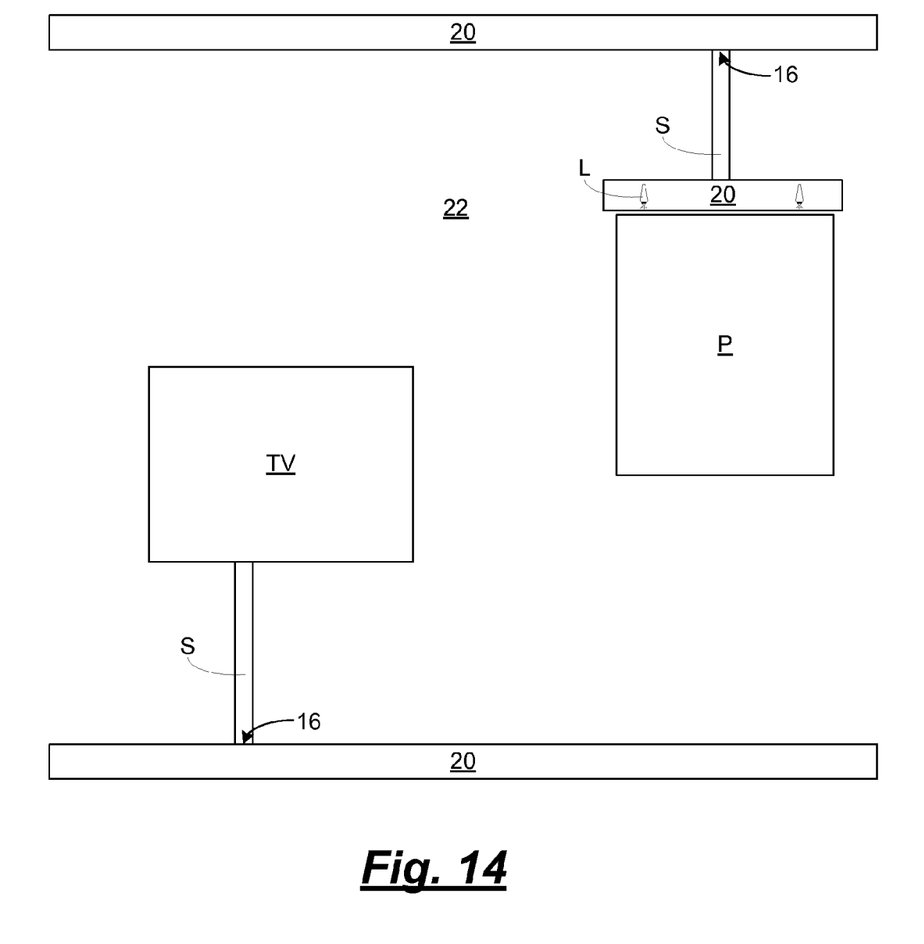
FIG. 14 shows embodiments of the invention which might be used to route cables to various electronic components, light bars, picture frames, and other devices traditionally situated on or near a wall or partition.

As shown in FIG. 14, in one embodiment, cables 12 or some portions thereof may be at least partially enclosed in sheaths S where they enter and/or exit the device through portals 16. Such sheaths will advantageously camouflage the cable 12 when the sheaths are configured to have an appearance and/or color that is similar to that of the device and/or substrate 22. In one embodiment, the sheaths S may include lights therein to provide a desired color to the sheaths S. In one embodiment, lights within the sheaths S or other components of the device may vary in intensity and/or color based on a user's preference, and/or an operative connection to one or more electronic components, such as a television TV or audio/visual system. In one embodiment, the device may include one or more external lights L for casting a desired light on a target area. Such lights may be fixed, or movable, and may also be configured to pop-up from a first position that is relatively continuous with a surface of the device, to a second position. As shown in FIG. 14, such lights L may advantageously provide lighting to a picture P or other art work positioned near a first member 20 having such a configuration. As used herein, "sheaths" is a term of convenience used to identify secondary components of embodiments of the device, which may be utilized to route cable from primary components (e.g., first and/or second members) to a target area, usually by passage through a portal 16.

In one embodiment, the invention may comprise a picture-frame comprising first members configured to provide lighting at one or more desired points along a perimeter thereof. Such an embodiment advantageously provides a means for providing a desired lighting to an art work or other object disposed in the picture frame, while hiding the cables required to provide such lighting. In one embodiment, the lights will be configured to blend with the decorative style of the picture frame and may also be positionable or may pop-up from the picture frame. In one embodiment, the lights will be disposed on a surface of the first member facing the center of the picture frame. In one embodiment, at least an interior portion (towards the center of the frame) will be configured to provide a diffuse light to an object placed in the frame.

Figure 15:
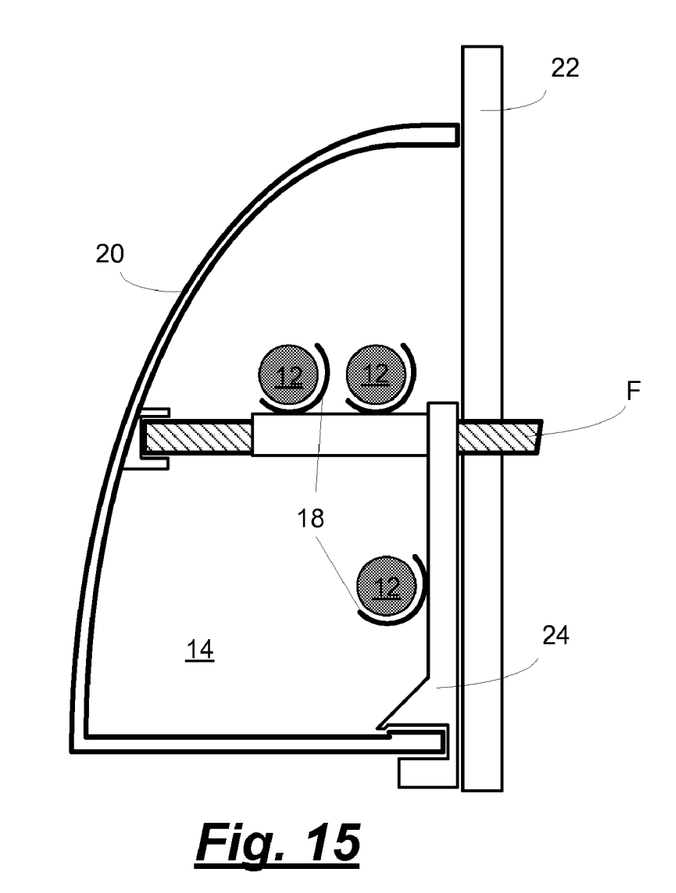
FIG. 15 shows one embodiment of the invention, in which a second member is used in conjunction with an extended fastener to operatively connect a first member to a substrate.

In one embodiment, clasps 18 may be operatively connected to a substrate 22 such that they will extend into a space which will be disposed between a first member 20 and the substrate 22 when the first member 20 is operatively connected to the substrate 22 or a second member 24 operatively connected thereto. As shown in the embodiment of FIG. 15, such clasps 18 may be operatively connected to a fastener F either directly, or through an operative connection to a second member 24. In the embodiment of FIG. 15, the fastener F operatively connects both a first member 20 and a second member 24 to a substrate 22. In this configuration, the second member is configured to frictionally retain a bottom portion of the first member 20, while the fastener F operatively connects to a second location on the first member 20, thereby advantageously providing a system wherein a second member 24 and desired number of clasps 18 may be disposed at a desired location, cables 12 may be operatively connected to the clasps 18, and then the first member 20 may be operatively connected to the fastener F and/or second member 24 to form a conduit 14 containing the cables 12. Such configurations advantageously provide for a simplified access to the conduit 14 such that additional cables 12 may be run, or excess cables 12 removed. Operative connections between the various components may be of any type known in the art.

Figure 16:
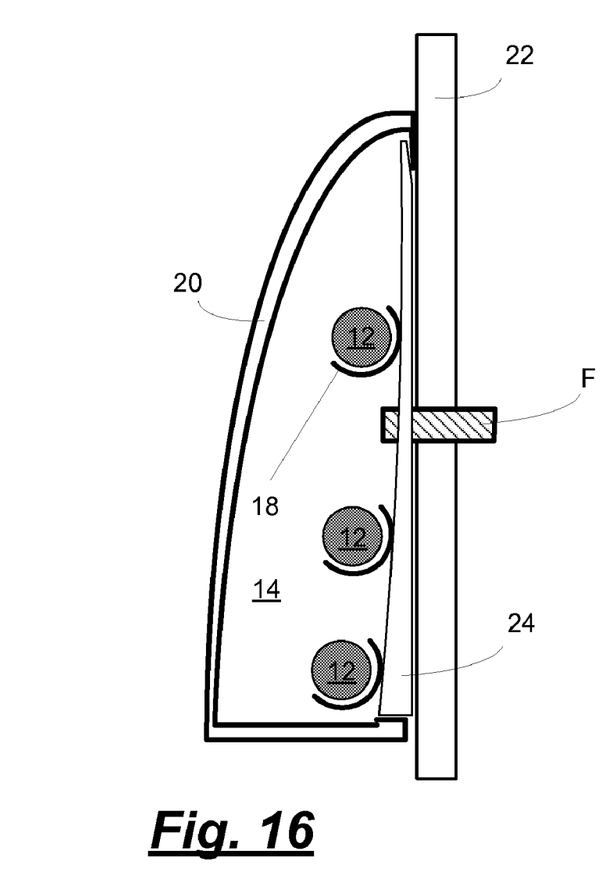
FIG. 16 shows one embodiment of the invention, in which a second member is configured to provide a mating surface at one end, and a frictional surface at a second end, for operatively connecting a first member to a substrate.

FIG. 16 shows one embodiment of the invention, wherein a second member 24 comprises at least one clasp 18 or connection points therefor, and is operatively connected to a substrate 22 using a fastener F. A first member 20 is reversibly connectible to the second member 24 by fitting into a slot thereof at the top, and being frictionally retained at the bottom.

Figure 17:
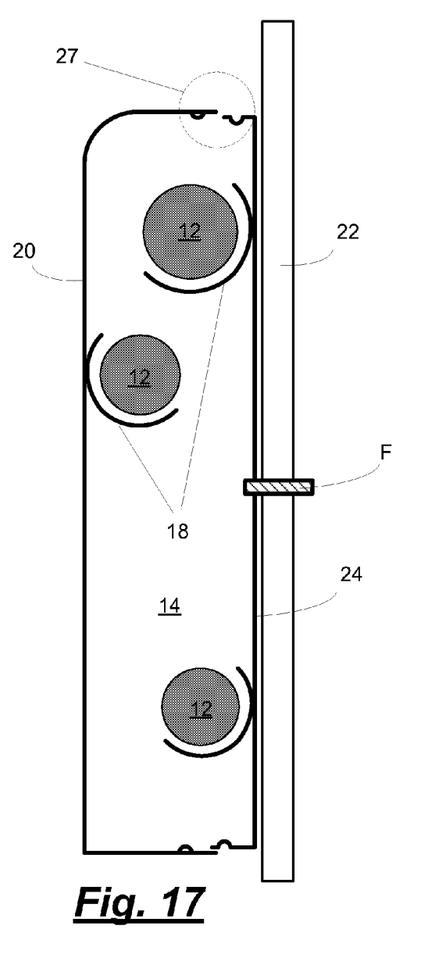
FIG. 17 shows one embodiment of the invention, in which the first and second members are configured to form frictional operative connections at top and bottom portions thereof, to provide an easily reversibly connection and access to the conduit.

As shown in the embodiment of FIG. 17, the first and second members 20, 24 may be configured to form a frictional operative connection (one set indicated at 27), to easy the operative connection and reversal thereof between the two members. Such a configuration advantageously provides for an easy connection of the two members after connecting the second member to a substrate, and also simplifies later access to the conduit 14 as may be required to dispose additional cables 12 therein, or remove excess cable 12 therefrom. Clasps 18 may be operatively connected to an interior surface of either member.

In one embodiment, the second member 24 may comprise a longitudinal slot that is suspended at a predetermined height along a substrate 22. One or more clasps 18 may be disposed on an outer surface of the second member 24 or an inner surface of a first member 20. The first member 20 may operatively connect to the second member 24 by having a surface configured to mate with the slot of the second member 24, thereby suspending the first member 20 from the second member 24. Such an embodiment advantageously provides an easily mounted conduit for cables wherein the first member 20 may comprise a single piece having a decorative appearance, lacking any visible fastening means once operatively connected to the substrate.

Although not apparent from the various cross-sectional views, the second member 24 need not correspond to the first member 20 in terms of length, or any other dimension. In one or more embodiments, the second member 24 may comprise a fastener 18 configured to retain a first member 20 and/or one or more cables 12. In such embodiments, a plurality of second members 24 may be used with/operatively connected to, each section of the first member 20.

Although the device has been described for use with cables 12, it also may be used with any other elongate object such as a hose or pipe. The operative connections between members and/or substrate 22 may be of any type known in the art, and may include adhesives. Furthermore, the device need not extend along any predetermined portion of a substrate 22. Instead, discreet sections of the device may be used anywhere there is a need to store and/or route one or more cables 12. Embodiments of the invention may be used along any wall or partition, including those disposed outdoors or in any type of structure, whether fixed or floating, as well as in place of or in conjunction with any traditional molding.

Although clasps 18 have been described for operatively connecting a cable 12, cables 12 may also be disposed within a conduit 14, according to various embodiments, without clasps. In one embodiment, the invention may comprise a single hollow member configured to resemble a traditional molding. One or more cables may be routed through the hollow prior to operatively connecting the member to a substrate.

In one embodiment, the invention comprises a method for manufacturing a device for the routing and/or storage of one or more cables. The method comprises providing a first member, and disposing a conduit in the first member. In one embodiment, the method comprises configuring a first member such that a conduit will be formed between the first member and a second member or substrate. In one embodiment, the method further comprises operatively connecting one or more clasps to the first member and/or the second member.

In one embodiment, the invention comprises a method for using a device for the storage and/or routing of cables. The method comprises disposing at least one first member such that a conduit will be formed between some portion of the first member and a substrate, and operatively connecting the first member to the substrate. The method may further comprise operatively connecting a second member to the substrate such that it forms some portion of the operative connection between the first member and the substrate. The method may further comprise disposing at least one clasp in a conduit of the device, or such that the at least one clasp will extend into a conduit upon its formation.

First members 20 according to various embodiments of the device, may be formed into picture frame configurations, art niche configurations, and any other desired configuration where it would be advantageous to have cables running therethrough, to provide, for instance, light to an art object placed therein. Such configurations may comprise a plurality of first members 20, or may comprise a single first member 20, appropriately configured.

In one embodiment, the first member 20 and/or second member 24 may be configured to appear identical to a traditional molding from an external perspective. Such embodiments may include decorative colorations and/or patterns on an outer surface thereof. Such configurations may also be similar or identical in size to traditional moldings. In one embodiment, the invention will have a total depth (from an exterior surface to an operatively connected substrate of 30 mm or less, and a height from top to bottom of 100 mm or less. In one embodiment, such dimensions may be preferably limited to 20 mm and 80 mm, respectively. In one embodiment, such dimensions may be more preferably limited to 15 mm and 60 mm, respectively.

Lights used with embodiments of the invention may be of any type known in the art, including LEDs, and rope lighting. In one embodiment, the invention is used along an outer surface of a structure such that lights disposed within one or more members thereof will be visible. Such embodiments advantageously provide a decorative, accent, or security lighting to a desired area. In one embodiment, the invention comprises weather-resistant components for use in outdoor areas. Various embodiments may include lights disposed within the conduit such that light is visible through a member of the device. Various embodiments may include lights disposed along a surface thereof, such that light may be provided at desired locations. Such embodiments may be particularly advantageous for use as crown moldings along a ceiling/wall junction to provide lighting for a space, or targeted at desired locations, such as positions on the wall where artwork may be disposed, or towards seating areas, etc. Such embodiments may advantageously be configured to include recessed lighting.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A molding for enclosing a length of cable, comprising:
   at least one longitudinal first member, having a height substantially greater than its width, and comprising at least one outer surface selected to mimic a predetermined style of molding;
   at least one second member, configured to operatively connect the at least one first member to a substantially vertically-oriented substrate, such that the at least one first member will be suspended along a substantially vertically-oriented surface of the substantially vertically-oriented substrate;
   wherein a first selected from an inner surface of the at least one first member and an outer surface of the at least one second member, is configured as at least a portion of a wall of at least one longitudinal conduit extending substantially along the length of the molding, the conduit configured to substantially enclose the length of cable such that the length of cable will be substantially hidden from view therein.

2. The molding of claim 1, wherein the operative connection between the at least one first member and the at least one second member comprises at least one selected from (a) a hinge, (b) mating elements, (c) a fastener, and (d) a living hinge.

3. The molding claim 1, wherein the at least one second member comprises at least one selected from a portal and a fastener.

4. The molding of claim 1, wherein at least one selected from the first member and the second member is configured to support at least one cable.

5. The molding of claim 1, wherein the at least one first member comprises at least one portal.

6. The molding of claim 1, wherein the at least one first member is configured to operatively connect directly to the substrate in a manner selected from hingeable, reversible, and flexible.

7. The molding of claim 1, further comprising at least one clasp disposed within the at least one longitudinal conduit.

8. The molding of claim 1, further comprising at least one outlet.

9. The molding of claim 1, wherein the at least one first member further comprises at least one connector for operatively connecting with at least one second member.

10. The molding of claim 1, wherein at least one end of the at least one first member is configured to operatively connect to at least one other first member.

11. A method for at least partially enclosing a length of cable, comprising:

providing a longitudinal first member having an outer surface configured in the shape of a preselected style of molding, and an inner surface configured to form at least a portion of a wall of at least one longitudinal conduit;

providing at least one second member configured to operatively connect to the longitudinal first member and to a substrate, one side of the at least one second member configured to form at least a portion of a wall of the at least one longitudinal conduit;

operatively connecting the at least one second member to a substantially vertically-oriented surface of the substrate; and operatively connecting the longitudinal first member to the at least one second member such that the longitudinal first member is operatively connected to, and supported along, the substantially vertically-oriented surface of the substrate, and the at least one longitudinal conduit disposed between the longitudinal first member and the substrate, for enclosing the length of cable.

12. The method of claim 11, further comprising disposing at least one clasp in the at least one longitudinal conduit.

13. A device for at least partially enclosing a length of cable, comprising:

a longitudinal sheet folded along its longitudinal axis to form a longitudinal conduit having at least one substantially flat surface configured to be operatively connectible to a substantially vertical substrate, the longitudinal sheet having first and second ends and first and second longitudinal side edges, first and second mating elements proximal the first and second side edges, configured to reversibly connect to one another to substantially close the conduit such that any length of cable placed therein will be enclosed and supported when the device is operatively connected to the substantially vertical substrate.

14. The device of claim 13, further comprising at least one clasp disposed within the conduit.

\* \* \* \* \*